(12) United States Patent
Togare

(10) Patent No.: US 8,338,988 B2
(45) Date of Patent: Dec. 25, 2012

(54) ADAPTATION OF AN ACTIVE POWER SUPPLY SET USING AN EVENT TRIGGER

(75) Inventor: Radhakrishna Togare, Vancouver, WA (US)

(73) Assignee: LSI Corporation, Milpitas, CA (US)

( * ) Notice: Subject to any disclaimer, the term of this patent is extended or adjusted under 35 U.S.C. 154(b) by 111 days.

(21) Appl. No.: 12/425,494

(22) Filed: Apr. 17, 2009

(65) Prior Publication Data

US 2010/0264741 A1    Oct. 21, 2010

(51) Int. Cl.
*H02J 1/00* (2006.01)
*H02J 3/00* (2006.01)

(52) U.S. Cl. ............... 307/85; 307/86; 307/87; 713/324

(58) Field of Classification Search ............. None
See application file for complete search history.

(56) References Cited

U.S. PATENT DOCUMENTS

| | | | | |
|---|---|---|---|---|
| 5,892,299 | A * | 4/1999 | Siewert et al. | 307/85 |
| 5,939,799 | A * | 8/1999 | Weinstein | 307/64 |
| 6,018,204 | A * | 1/2000 | Kuruma | 307/64 |
| 6,654,264 | B2 * | 11/2003 | Rose | 363/65 |
| 6,735,704 | B1 * | 5/2004 | Butka et al. | 713/300 |
| 7,906,871 | B2 * | 3/2011 | Freeman et al. | 307/85 |
| 7,962,769 | B1 * | 6/2011 | Patel et al. | 713/300 |
| 2002/0130712 | A1 * | 9/2002 | Naffziger et al. | 327/544 |
| 2003/0056125 | A1 * | 3/2003 | O'Conner et al. | 713/300 |
| 2005/0215227 | A1 * | 9/2005 | Vu et al. | 455/343.2 |
| 2005/0280312 | A1 * | 12/2005 | Litovsky et al. | 307/64 |
| 2006/0290327 | A1 * | 12/2006 | Lee | 323/210 |
| 2007/0150763 | A1 * | 6/2007 | Yang et al. | 713/300 |
| 2007/0216229 | A1 * | 9/2007 | Johnson et al. | 307/86 |
| 2008/0009248 | A1 * | 1/2008 | Rozenblit et al. | 455/127.1 |
| 2008/0122518 | A1 * | 5/2008 | Besser et al. | 327/518 |
| 2008/0172565 | A1 * | 7/2008 | Chu et al. | 713/300 |
| 2009/0158070 | A1 * | 6/2009 | Gruendler | 713/340 |
| 2009/0174262 | A1 * | 7/2009 | Martin et al. | 307/82 |
| 2010/0077238 | A1 * | 3/2010 | Vogman et al. | 713/310 |

* cited by examiner

*Primary Examiner* — Rexford Barnie
*Assistant Examiner* — Justen Fauth
(74) *Attorney, Agent, or Firm* — Raj Abhyanker, P.C.

(57) ABSTRACT

A method and systems of adaptation of an active power supply set using an event trigger are disclosed. In an embodiment, a method includes providing power to a system load using an active power supply set. The active power supply set includes a power supply in an active mode. The method also includes detecting an event trigger. In addition, the method includes increasing a power mode of an additional power supply when the event trigger is detected. The method may include detecting an additional event trigger and decreasing the power mode of a unit of the active power supply set when the additional event trigger is detected.

20 Claims, 9 Drawing Sheets

| MODE | POWER SUPPLY 100A | POWER SUPPLY 100B | POWER SUPPLY 100C | POWER SUPPLY 100D |
|---|---|---|---|---|
| MODE I 316 | ON | WATCH | SLEEP | OFF |
| MODE II 318 | ON | ON | WATCH | SLEEP |
| MODE III 320 | ON | ON | ON | WATCH |
| MODE IV 322 | ON | ON | ON | ON |

FIGURE 4

ADAPTATION OF AN ACTIVE POWER SUPPLY SET USING AN EVENT TRIGGER

FIELD OF TECHNOLOGY

This disclosure relates generally to electrical technology, and more particularly to adaptation of an active power supply set using an event trigger.

BACKGROUND

A redundant power supply system may provide power for a range of system loads, including a lower threshold power level and an upper threshold power level. The redundant power supply system may distribute the load across one or multiple power supplies that make up the redundant power supply system. The distribution of the load may result in a use of one or more power supplies below its rated power output, which may result in an inefficient generation of power. The inefficient generation of power may fail to meet an environmental standard, may consume excess resources, and may result in an additional cost of power.

SUMMARY

This summary is provided to comply with 37 C.F.R. §1.73, requiring a summary of the invention briefly indicating the nature and substance of the invention. It is submitted with the understanding that it will not be used to interpret or limit the scope or meaning of the claims.

A method and systems of adaptation of an active power supply set using an event trigger are disclosed.

In an exemplary embodiment, a method includes providing power to a system load using an active power supply set. The active power supply set includes a power supply in an active mode. The method further includes detecting an event trigger and increasing a power mode of an additional power supply when the event trigger is detected.

An exemplary embodiment includes a power supply system. The power supply system includes an active power supply set to provide power to a system load. The active power supply set is comprised of a power supply in an active mode. In addition, the system includes an observation module to detect an event trigger. The system also includes an additional power supply. The system further includes a power control module to increase a power mode of the additional power supply when the event trigger is detected.

In an exemplary embodiment a method includes providing power to a system load using an active power supply set. The active power supply set includes a power supply in an active mode. A utilization of the active power supply set is increased by operating an additional power supply in a lower power mode. The method further includes detecting an event trigger that includes an increased system load that exceeds a combined power capacity of the active power supply set by an upper threshold limit. The combined power capacity includes a sum of a power rating of each unit of the active power supply set.

The method also includes increasing a power mode of the additional power supply to the active mode when the event trigger is detected. In addition, the method also incorporates including the additional power supply in the active power supply set. The method further includes utilizing the power supply of the active power supply set within a threshold tolerance range of a rating of the power supply when the power mode of the additional power supply is increased. In addition, the method includes detecting an additional event trigger comprised of a decreased system load that falls below a lower threshold limit that is supportable by one less than a number of power supply units in the active power supply set. The method further includes decreasing a power mode of a unit of the active power supply set when the additional event trigger is detected.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 4 is a table view illustrating power supply states in different modes, according to one embodiment.

Other features of the present embodiments will be apparent from the accompanying drawings and from the detailed description that follows.

DETAILED DESCRIPTION

A method and systems of adaptation of an active power supply set using an event trigger are disclosed.

Although the present embodiments have been described with reference to specific example embodiments, it will be evident that various modifications and changes may be made to these embodiments without departing from the broader spirit and scope of the various embodiments.

Figure 1A:
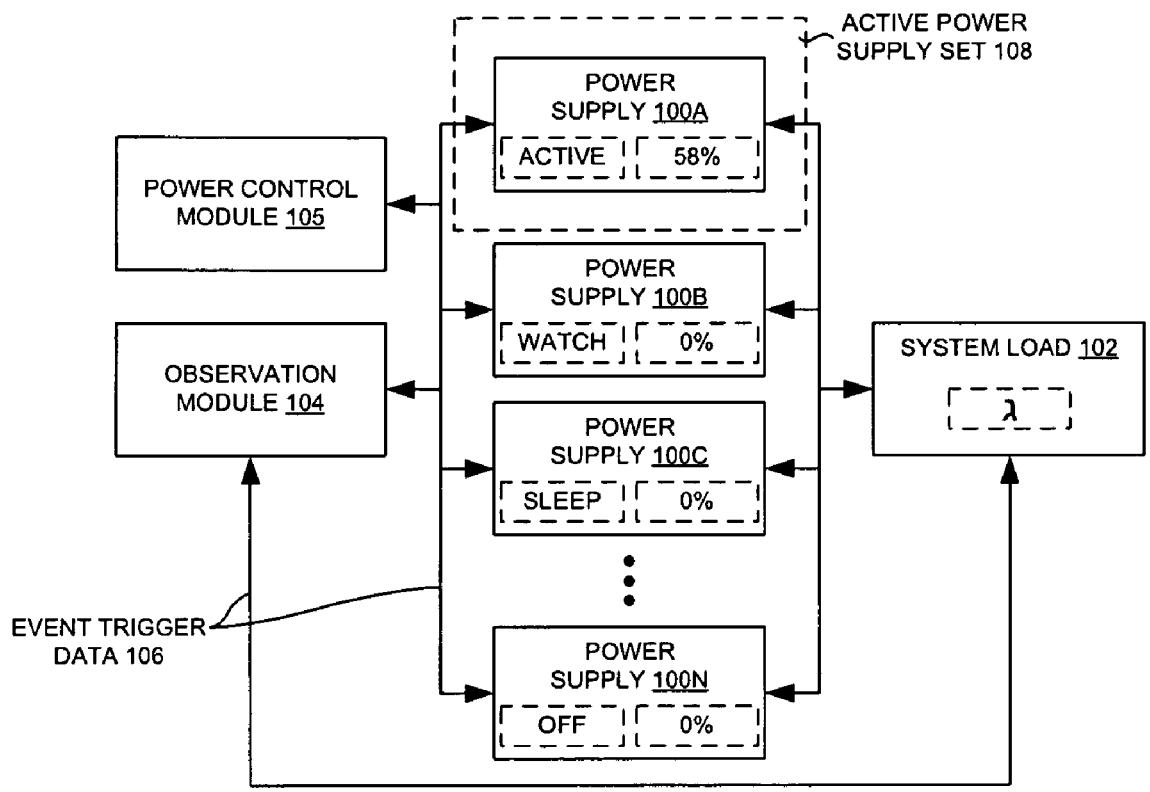
FIGS. 1A and 1B are system views illustrating increasing a power mode of an additional power supply when the event trigger is detected, according to one embodiment.
Figure 1B:
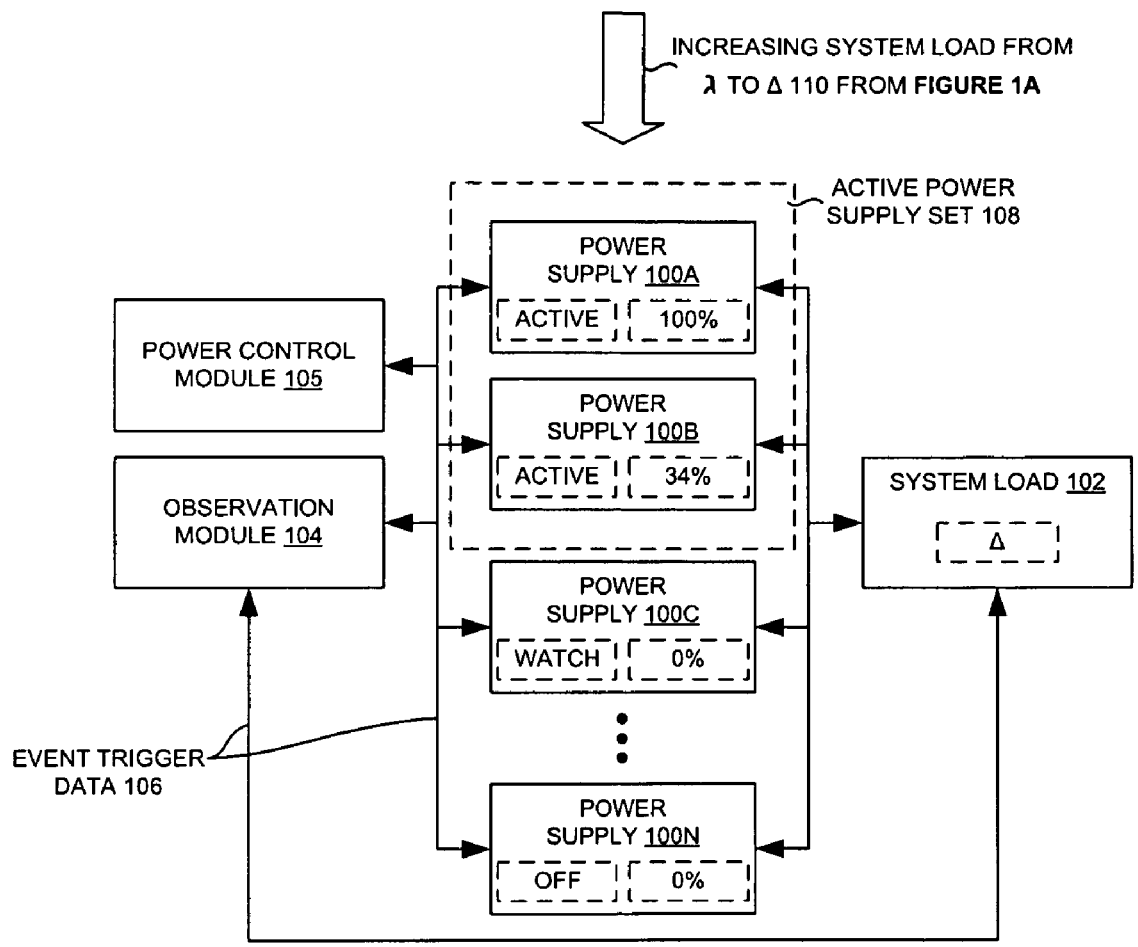

FIGS. 1A and 1B are system views illustrating increasing a power mode of an additional power supply when the event trigger is detected, according to one embodiment. In particular, FIGS. 1A and 1B illustrate a power supply 100A-N, a system load 102, an observation module 104, a power control module 105, an event trigger data 106 and an active power supply set 108, according to one embodiment.

The observation module 104 may be coupled to the power supply 100A-N and the system load 102. The power control module 105 may be coupled to the power supply 100A-N. The power supply 100A-N may be coupled to each other and to the system load 102. An active power supply set 108 may include one or more of the power supply 100A-N that is in an active mode, which may be substantially equivalent to an on mode. The power supplies 100A-N may be coupled in parallel.

The power supplies 100A-N may be sources of current and voltage for the system load 102. Each power supply 100A-N may be operated in one of several states, including: on, watch, sleep, and off. Each power supply 100A-N may be utilized between 0% and 100% of its rated power capacity. The power supply 100A-N may be used in excess of 100% of its rated power capacity, which may depend on a design tolerance of a manufacturer of the power supply. In an embodiment, the power supply 100A-N is an electronic device that generally increases in efficiency as its power generation approaches its power rating and decreases in efficiency when it generates power substantially below its power rating. In an additional embodiment, the power supply 100A-N is an electronic device that decreases in efficiency as it increases its power generation substantially above its power rating.

In an embodiment, each power supply 100A-N that is part of the active power supply set 108 provides power to the system load 102. The power supply 100A-N of the active power supply set 108 may provide power between 0% and 100% of its rated capacity. In the embodiment, as the number of power supplies 100A-N that provide power substantially at 100% is increased, the efficiency of the power generation by the power supply system is increased.

The system load 102 may be the power utilized by one or more pieces of hardware, such as servers, fans, hard drives, processors, displays, cameras, and other devices. The system load 102 may increase or decrease over time, and the power utilized may be represented by the variable $\lambda$. The power utilized by the system load 102 may vary between $\lambda$ and $\Delta$, and the transition from FIG. 1A to FIG. 1B may represent an increase in power utilized by the system load 102 from $\lambda$ and $\Delta$ 110.

In an embodiment, the power supply 100A may be part of an active power supply set 108. The power supply 100A may have an active state, and it may supply power to the system load 102 between a lower system load and a threshold system load that utilizes the rated output of the power supply 100A. Any additional system load may be powered by the additional power supply 100B. The level of an additional system load may be sensed by the observation module 104.

The observation module 104 may include sensor circuitry, switches, relays, and other devices that enable the observation module 104 to detect an event trigger. The event trigger data 106 may include a change in the system load 102 state, such as from $\lambda$ to $\Delta$. The event trigger data 106 may include the states of the power supply 100A-N or the level of utilization of the power supply's 100A-N rated output.

The power control module 105 may include sensor circuitry, switches, relays, and other devices that enable the power control module 105 to increase a power mode of the additional power supply when the event trigger is detected. The power control module 105 may decrease the power mode of a unit of the active power supply set when the additional event trigger is detected. The power control module 105 may be hardware or software, and may be internal or external to each of the power supplies 100A-N.

In an example embodiment, the system load 102 level may be $\lambda$. The power supply 100A may be in an active state providing 58% of its rated power output to the system load 102. At some point in time, there may be an increase in the system load 102 from $\lambda$ to $\Delta$, which may exceed a combined rated power output of the active power supply set 108. The observation module 104 may receive an event trigger data 106, which may include the change in the system load 102 from $\lambda$ to $\Delta$. The event trigger data 106 may include the state of the power supply 100A-N and the current power output level for each of the power supplies 100A-N. The event trigger may be an increased system load 102 that exceeds a threshold limit, which may be substantially equivalent to a combined power capacity of substantially all units of the active power supply set.

After the event trigger data 106 is received by the observation module 104, the state of the power supply 100A may remain active, and its power output may increase from 58% to 100% of its rated power capacity. The power supply 100A may provide power more efficiently at 100% of its rated power capacity than at 58%. The state of the power supply 100B may increase from a watch mode to an active mode, and it may provide power to the system load 102, which may be at a level $\Delta$. The utilization of the power supply 100B may increase from 0% to 34% of its rated power output.

In the embodiment, after the event trigger is detected by the observation module 104, the state of the power supply 100C may be changed from a sleep mode to a watch mode. The state of the power supply 100N may remain in an off mode. The watch mode may enable a power supply 100A-N to transition to an active mode in which it provides power to the system load. The watch mode may be higher than a sleep mode, which may in turn be higher than an off mode. The watch mode may consume less power than the active mode and more power than the sleep mode. The sleep mode may consume more power than the off mode. The time to transition between a watch mode and an active mode may be less than the time needed to transition between a sleep and a watch mode. The time used to transition between a sleep mode and an off mode may be greater than the time used to transition between a sleep mode and a watch mode. The time required to transition between each of the modes may vary, and a power supply may be capable of transitioning from any one mode directly to another mode. Additional information regarding power supply modes may be illustrated in FIG. 4.

Raising a state of a power supply 100A-N may enable it to power the system load 102. Lowering a state of a power supply 100A-N may disable it, which may conserve energy. Enabling or disabling the power supplies 100A-N may occur sequentially or simultaneously. The outputs of the power supplies may be an ORed output, which may be coupled to the system load 102. The transition between the parallel power supplies may take place linearly, abruptly, and dynamically.

The utilization of the power supply of the active power supply set 108 may be within a threshold tolerance range of a rating of the power supply 100A-N when the power mode of the additional power supply is increased. In an embodiment, the power supply 100A may provide power within 25% of its rated output when one or more of the power supplies 100B-N are increased in power mode. In an embodiment, the utilization of the active power supply set 108 may be increased by operating an additional power supply in a lower power mode. For example, the utilization of the power supply 100A may be 100% of its rated output while the output of the power supply 100B is 34%.

Figure 2A:
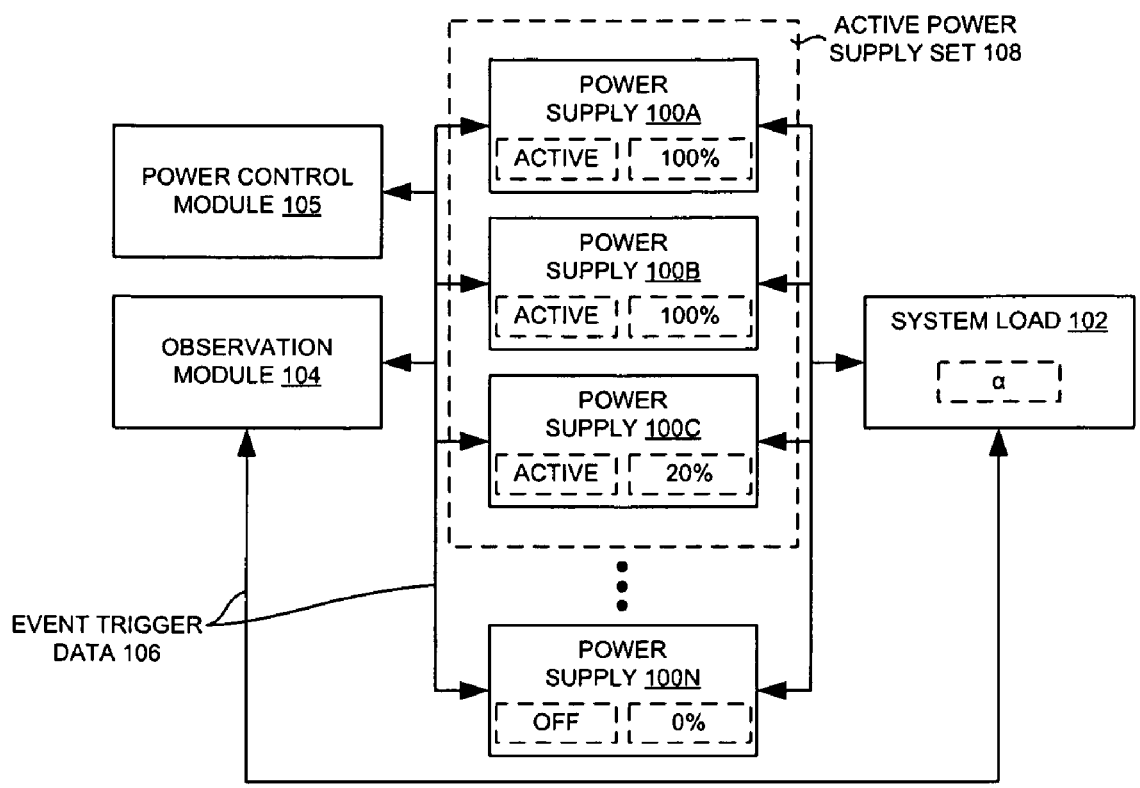
FIGS. 2A and 2B are system views illustrating decreasing a power mode of a unit of the active power supply set when an additional event trigger is detected, according to one embodiment.
Figure 2B:
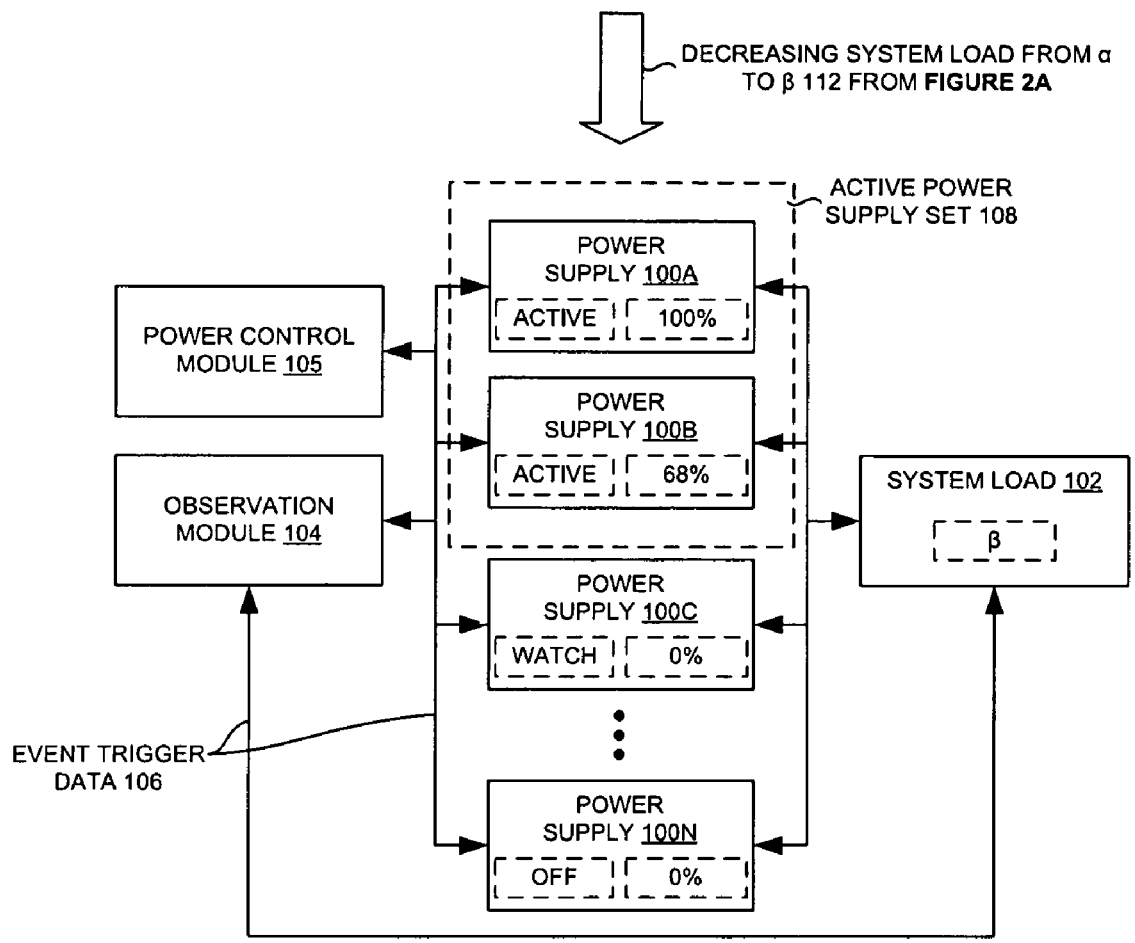

FIGS. 2A and 2B are system views illustrating decreasing a power mode of a unit of the active power supply set 108 when the additional event trigger is detected, according to one embodiment. In particular, FIG. 2A and FIG. 2B illustrate the power supply 100A-N, the system load 102, the observation module 104, the event trigger data 106, the active power supply set 108, and decreasing system load 102 from $\alpha$ to $\beta$ 112, according to one embodiment.

In an example embodiment, FIG. 2 illustrates an instance when the system load 102 is decreased from $\alpha$ to $\beta$. In FIG.

2A, the system load 102 α may use the power supply 100A-100C. The active power supply set 108 may include the power supply 100A, the power supply 100B, and the power supply 100C. The power supplies 100A-B may operate in full operating condition, which may be 100% of the rated power supply output. The power supply 100C may provide the remaining 20% to meet the level of the system load 102 α. A remaining power supply 100D may be in watch mode, prepared to operate when useful.

In FIG. 2B, the system load 102 α may come down to the lower system load level β, which may be included in an event trigger data 106. The observation module 104, upon sensing event trigger data 106, may switch the power supply 100C to the watch mode and reduce its power output to 0% of its rated output capacity. The power supply 100B may be in an active mode, and it may provide 68% of its rated output. The remaining power supplies may be put into sleep or inactive modes.

Figure 3:
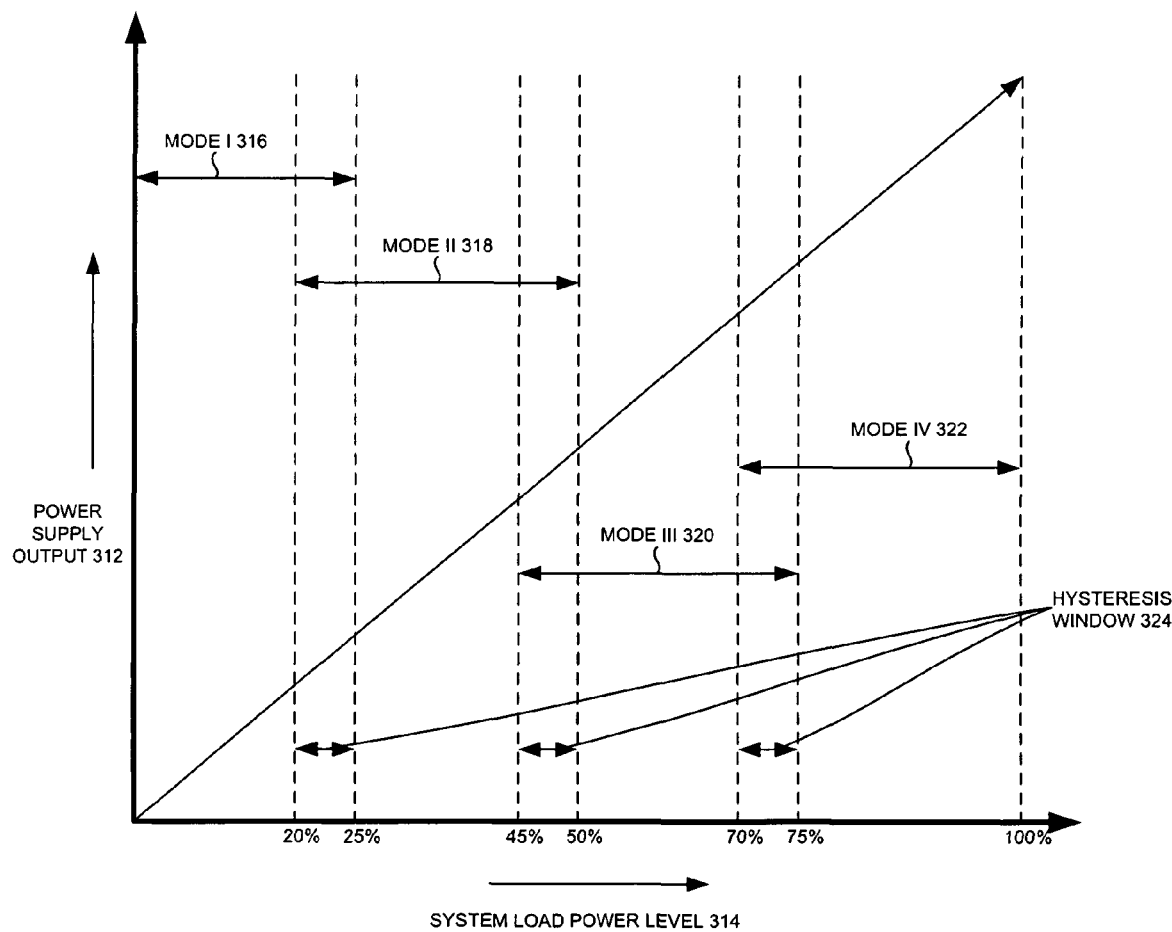
FIG. 3 is a graphical view illustrating power provided using multiple modes in response to a system load power level, according to one embodiment.

FIG. 3 is a graphical view illustrating power provided using multiple modes in response to a system load power level, according to one embodiment. In particular, FIG. 3 illustrates power 312, the system load power level 314, Mode I 316, Mode II 318, Mode III 320, Mode IV 322, and a hysteresis window 324, according to one embodiment.

In an example embodiment, the modes described are for four power supply units. The same concept may be used for a system having 'N' number of power supply units. In an embodiment, the truth table for different modes in which the power supplies 100A-N of FIG. 3 may be operated is illustrated in FIG. 4. In another embodiment, fewer modes may be used. For example, an embodiment may use an active, watch, and off mode. Alternatively, an embodiment may use only an active mode and a lower power mode, which may be watch, sleep, or off. The active mode may be substantially the same as the on mode described with respect to FIG. 4.

In an embodiment, Mode I 316 may be used to provide power between 0% and 25% of the system load level. Mode II 318 may be used to provide power from 25% to 50% of the system power level, and Mode III 320 may be used to provide power from 50% to 75% of the system load power level. Mode IV 322 may be used to provide power from 75% to 100% of the system load power level. In other embodiments, any system load power level 314 threshold may be used between various modes, depending on the power capability of each mode and a desired hysteresis window size.

As the system load power level 314 increases, transitions between Mode I 316 and Mode II 318 may occur at approximately 25% of the system load level 314. Transitions between Mode II 318 and Mode III 320 may occur at 50%, and transitions between Mode III 320 and Mode IV 322 may occur at 75% of the system load level 314.

As the system load power level 314 decreases, transitions between Mode I 316 and Mode II 318 may occur at approximately 20% of the system load power level 314. Transitions between Mode II 318 and Mode III 320 may occur at 45%, and transitions between Mode III 320 and Mode IV 322 may occur at 70% of the system load power level 314.

A hysteresis window 324 may exist between 20% and 25%, between 45% and 50%, and between 70% and 75% of the system load power level 314. The upper level of the hysteresis window 324 may represent an upper threshold limit at which a rated power output of the power supply 100A-N that are active in the mode has been met. The upper threshold limit may be substantially equivalent to a combined power capacity of substantially all units of the active power supply set 108.

The lower level of the hysteresis window 324 may represent a lower threshold limit in which the system load power level 314 is supportable by one less than a number of power supply units in the active power supply set 108. In other words, the lower threshold limit may represent a power level where one of the power supply 100A-N may be removed from the active power supply set 108 while still providing sufficient power to supply the system load power level 314.

The hysteresis window 324 may enable a system load power level 314 to fluctuate between an upper and a lower threshold without triggering a change in modes. For instance, a first mode may provide power for the system load power 314 until an upper threshold limit is reached, at which point a second mode may be activated to provide additional power to the system load power level 314. The second mode may continue to provide power to the system load power level 314 until the lower threshold limit of the hysteresis window 324 is reached. The lower threshold limit of the hysteresis window 324 may be lower than the upper threshold limit of the hysteresis window 324.

Figure 5:
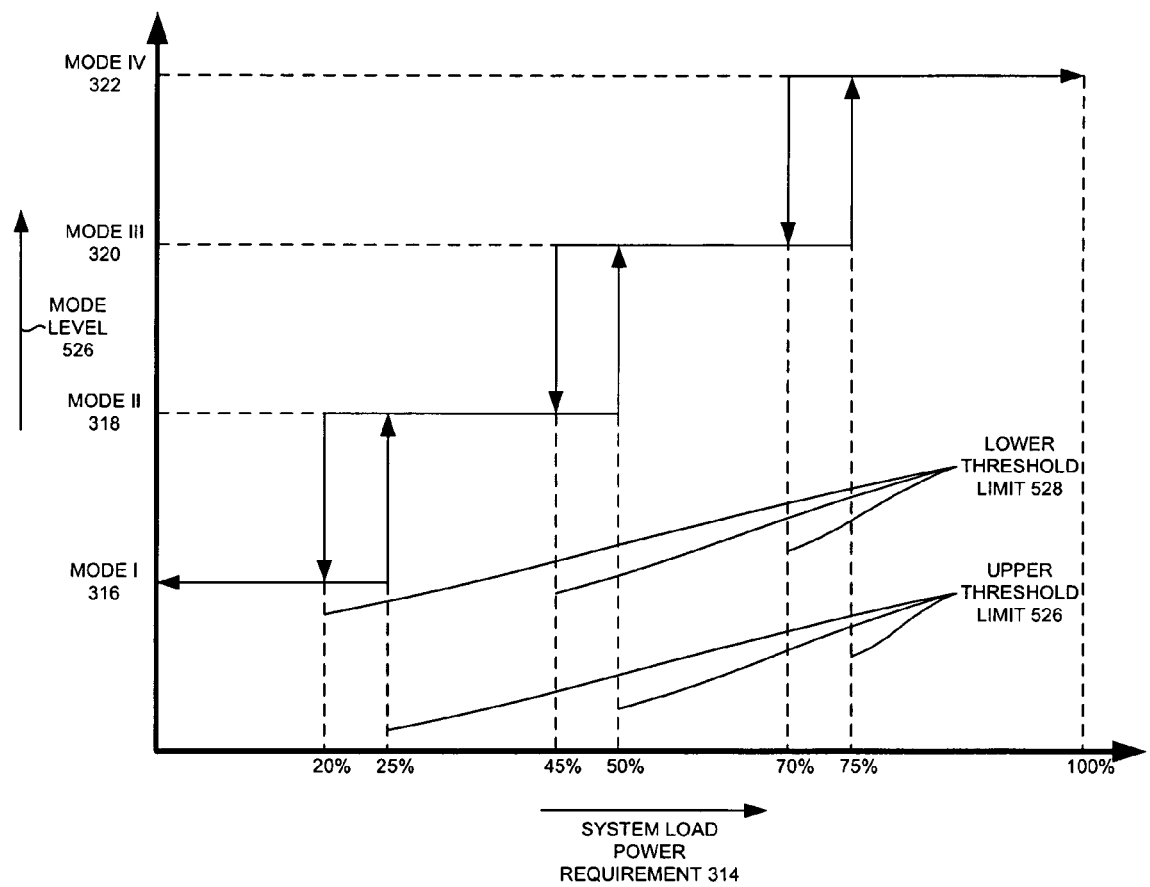
FIG. 5 is a graphical representation illustrating different modes, associated system load levels, and a hysteresis window, according to one embodiment.

The hysteresis window may be better understood from FIG. 5.

FIG. 4 is a table view illustrating power supply states in different modes, according to one embodiment. In particular, FIG. 4 illustrates mode and power supply fields, according to one embodiment. FIG. 4 may illustrate a truth table for the graphical view illustrated in FIG. 3. In Mode I 316, the power supply 100A may be on, the power supply 100B may be in a watch mode, the power supply 100C may be in a sleep mode, and the power supply 100D may be off. In Mode II 318, the power supply 100A may be on, the power supply 100B may be on, the power supply 100C may be in a watch mode, and the power supply 100D may be in a sleep mode. In Mode III 320, the power supply 100A, the power supply 100B, and the power supply 100C may be on, and the power supply 100D may be in a watch mode. In Mode IV 322, all the power supplies 100A-D may be on.

FIG. 5 is a graphical representation illustrating different modes, associated system load levels, and the hysteresis window, according to one embodiment. In particular, FIG. 5 illustrates Mode I 316, Mode II 318, mode III 320, Mode IV 322, upper threshold limit 526, and lower threshold limit 528. In an embodiment, FIG. 3 and FIG. 4 illustrated mode changes based on the system load 102 levels. The lower threshold limit 528 may be 20%, 45%, and 70% of the system load power level 314. The upper threshold limit 526 may be 25%, 50%, and 75% of the system load power level 314.

As the system load power level 314 increases, transitions between Mode I 316 and Mode II 318 may occur at approximately 25% of the system load level 314. Transitions between Mode II 318 and Mode III 320 may occur at 50%, and transitions between Mode III 320 and Mode IV 322 may occur at 75% of the system load level 314. As the system load power level 314 decreases, transitions between Mode I 316 and Mode II 318 may occur at approximately 20% of the system load level 314. Transitions between Mode II 318 and Mode III 320 may occur at 45%, and transitions between Mode III 320 and Mode IV 322 may occur at 70% of the system load level 314.

As the system load power requirement 314 increases or decreases, the mode levels of the power supply system may dynamically and automatically change in accordance with the upper threshold limits 526 and the lower threshold limits 528. The mode transition may be linear and in sequence.

Figure 6:
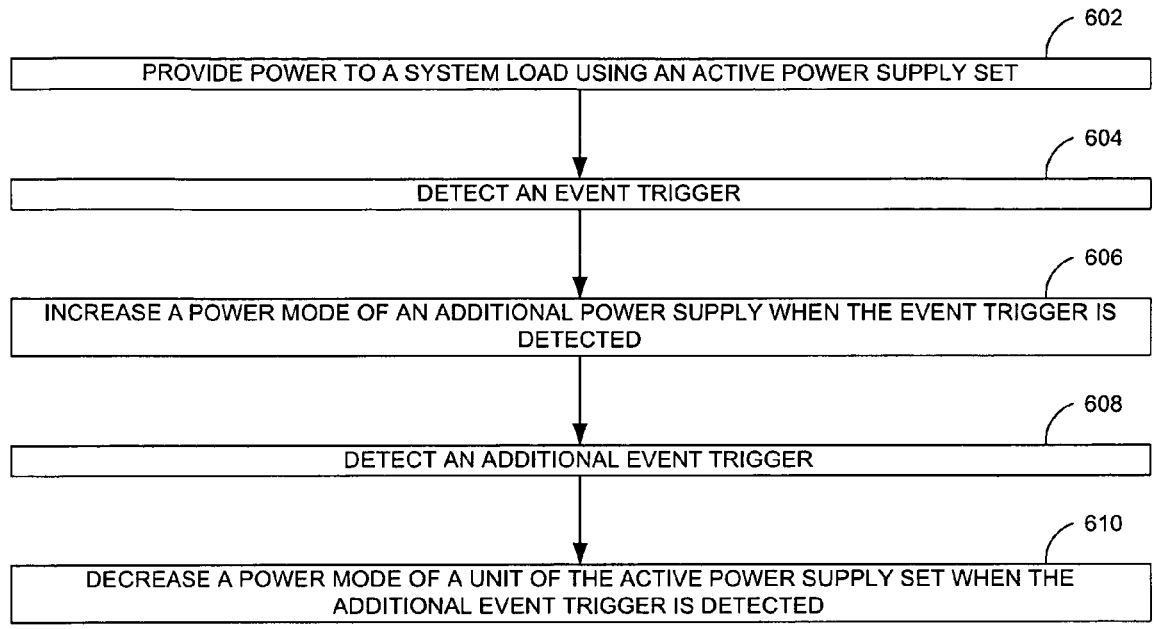
FIG. 6 is a process flow that illustrates increasing and decreasing a power mode, according to one embodiment.

FIG. 6 is a process flow that illustrates increasing and decreasing a power mode, according to one embodiment. In operation 602, power may be provided to the system load 102 using an active power supply set 108. The active power supply set 108 may include power supplies in an active mode (e.g., as illustrated in FIGS. 1 and 2). In operation 604, an event trigger may be detected. The event trigger may be detected using the event trigger data 106 that is analyzed by the observation module 104. In operation 606, a power mode of the additional power supply 10B-N may be increased when the event trigger is detected (e.g., as illustrated in FIG. 1). In operation 608, an additional event trigger may be detected. In operation 610, a power mode of a unit of the active power supply set 108 may be decreased when the additional event trigger is detected (e.g., as illustrated in FIG. 2).

Figure 7:
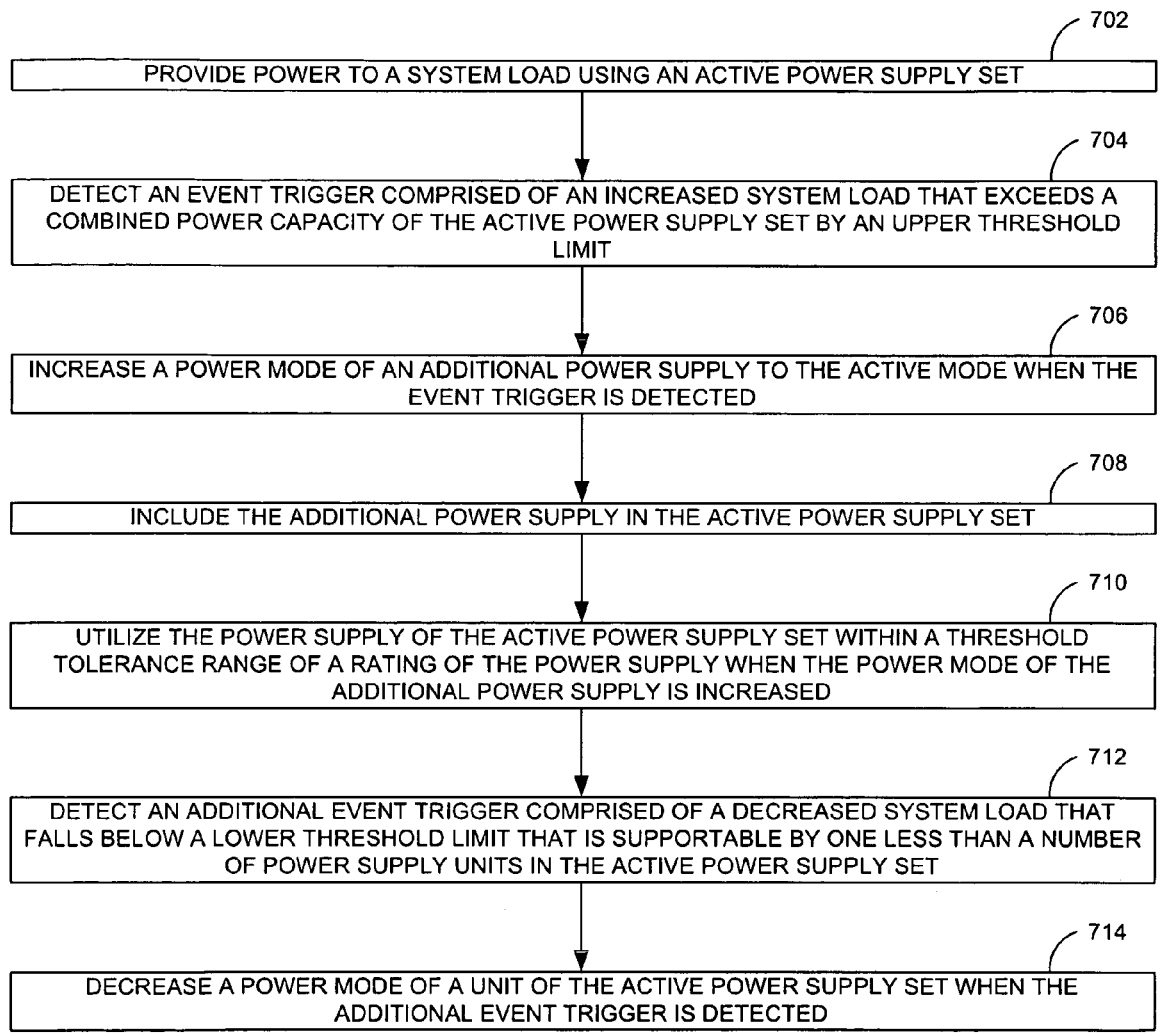
FIG. 7 is a process flow illustrating management of power supplies, according to one embodiment.

FIG. 7 is a process flow illustrating management of power supplies, according to one embodiment. In operation 702, power may be provided to the system load 102 using the active power supply set 108. The active power supply set 108 may include one or more of power supplies in the active mode. The active mode may be substantially the same as the on mode illustrated in FIG. 4. The utilization of the active power supply set 108 may be increased by operating an additional power supply in a lower power mode. In operation 704, an event trigger may be detected that includes an increased system load 102 that exceeds a combined power capacity of the active power supply set 108 by the upper threshold limit 526. The combined power capacity may be a sum of a power rating of each unit of the active power supply set 108. In operation 706, a power mode of the additional power supply 100B may be increased to the active mode when the event trigger is detected. In operation 708, the additional power supply 100B may be included in the active power supply set 108. In operation 710, the power supply of the active power supply set 108 may be utilized within a threshold tolerance range of a rating of the power supply when the power mode of the additional power supply is increased. In operation 712, an additional event trigger that includes a decreased system load may be detected that falls below the lower threshold limit 528 that is supportable by one less than a number of power supply units in the active power supply set 108. In operation 714, a power mode of a unit of the active power supply set 108 may be decreased when the additional event trigger is detected.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the observation module 104 and the power control module 105 may be enabled using software and/or using transistors, logic gates, and electrical circuits (e.g., application specific integrated ASIC circuitry) such an observation circuit, sensor circuit, switches and other circuits.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of a power supply system comprising:

forming a power supply set through ORing outputs of each of a plurality of power supplies coupled in parallel to support a common system load;

providing power to the system load using the power supply set, each of the plurality of power supplies of the power supply set being configured to have modes of operation associated therewith based on a power demand associated with the system load, at least one power supply of the power supply set being configured to operate in an active mode to provide requisite power to the system load, the each of the plurality of power supplies being capable of operating in the active mode and a plurality of non-active modes, and the each of the plurality of power supplies having a priority level associated therewith based on the mode of operation associated therewith; and dynamically modifying a mode of operation of at least one of the at least one power supply in the active mode and at least one power supply in a non-active mode sequentially in an order of the priority levels from a current state thereof in accordance with a variation in the power demand associated with the system load outside a threshold level of optimum operation of the at least one power supply in the active mode, the dynamic modification of the mode of operation including one of switching between a non-active mode and an active mode and switching between non-active modes, wherein whenever the power demand associated with the system load necessitates a power supply in a non-active mode to also be transitioned into the active mode in addition to the at least one power supply already in the active mode, each of the remaining power supplies is transitioned into a non-active mode having an immediately higher priority level than a current level thereof.

2. The method of claim 1, further comprising:

assigning the priority level to the each of the plurality of power supplies such that the active mode has a higher priority level than the plurality of non-active modes, the non-active modes being arranged in a priority order of power consumption of power supplies associated therewith.

3. The method of claim 2, further comprising sequentially modifying a priority level associated with at least one power supply in accordance with one of an increase and a decrease in the power demand associated with the system load.

4. The method of claim 2, further comprising preventing the at least one power supply whose priority level is modified from oscillating through a hysteresis window set to accommodate a transition between modes of operation of the at least one power supply.

5. The method of claim 2, wherein the plurality of non-active modes includes a watch mode, a sleep mode and an inactive mode, the watch mode having a higher priority level than the sleep mode and the sleep mode having a higher priority level than the inactive mode, and wherein a power consumed during the active mode is a maximum, followed by the watch mode, the sleep mode and the inactive mode in decreasing order, the sleep mode being a mode of operation associated with a minimal power utilization of a power supply and the inactive mode being a mode of operation associated with the power supply being turned OFF.

6. The method of claim 1, wherein an upper threshold limit of variation of the system load is associated with a combined power capacity of substantially all power supplies of the power supply set.

7. The method of claim 1, wherein when the power demand associated with the system load is outside the threshold level of optimum operation of the at least one power supply in the active mode, at least one other power supply is additionally switched to the active mode such that an operating level of the at least one power supply in the active mode continues to be within a threshold tolerance range of a rating thereof.

8. A power supply system comprising:
a power supply set comprising a plurality of parallelly coupled power supplies, each of whose outputs is ORed to support a common system load, at least one power supply of the power supply set being configured to operate in an active mode to provide requisite power to the system load, each of the plurality of power supplies of the power supply set being configured to have modes of operation associated therewith based on a power demand associated with the system load, the each of the plurality of power supplies being capable of operating in the active mode and a plurality of non-active modes, and the each of the plurality of power supplies having a priority level associated therewith based on the mode of operation associated therewith; and
a power control module to dynamically modify a mode of operation of at least one of the at least one power supply in the active mode and at least one power supply in a non-active mode sequentially in an order of the priority levels from a current state thereof in accordance with a variation in the power demand associated with the system load outside a threshold level of optimum operation of the at least one power supply in the active mode, the power control module being configured to dynamically modify the mode of operation through one of switching between a non-active mode and an active mode and switching between non-active modes,
wherein whenever the power demand associated with the system load necessitates a power supply in a non-active mode to also be transitioned into the active mode in addition to the at least one power supply already in the active mode, each of the remaining power supplies is transitioned into a non-active mode having an immediately higher priority level than a current level thereof.

9. The system of claim 8, wherein the power control module is configured to:
assign the priority level to the each of the plurality of power supplies such that the active mode has a higher priority level associated therewith than the plurality of non-active modes, the non-active modes being arranged in a priority order of power consumption of power supplies associated therewith; and
sequentially modify a priority level associated with at least one power supply in accordance with one of an increase and a decrease in the power demand associated with the system load.

10. The system of claim 9, wherein the power control module is configured to prevent the at least one power supply whose priority level is modified from oscillating through utilizing a hysteresis window set to accommodate a transition between modes of operation of the at least one power supply.

11. The system of claim 9,
wherein the plurality of non-active modes includes a watch mode, a sleep mode and an inactive mode, the watch mode having a higher priority level than the sleep mode and the sleep mode having a higher priority level than the inactive mode, and
wherein a power consumed during the active mode is a maximum, followed by the watch mode, the sleep mode and the inactive mode in decreasing order, the sleep mode being a mode of operation associated with a minimal power utilization of a power supply and the inactive mode being a mode of operation associated with the power supply being turned OFF.

12. The system of claim 8, wherein an upper threshold limit of variation of the system load is associated with a combined power capacity of substantially all power supplies of the power supply set.

13. The system of claim 8, wherein when the power demand associated with the system load is outside the threshold level of optimum operation of the at least one power supply in the active mode, at least one other power supply is additionally switched to the active mode such that an operating level of the at least one power supply in the active mode continues to be within a threshold tolerance range of a rating thereof.

14. A data processing module associated with a power supply set comprising a plurality of parallelly coupled power supplies, each of whose outputs is ORed to support a common system load, the data processing system comprising:
a memory; and
a processor configured to address a plurality of storage locations of the memory, the processor also being configured to execute instructions associated with:
dynamically modifying a mode of operation of at least one of at least one power supply in an active mode and at least one power supply in a non-active mode sequentially in an order of priority levels from a current state thereof in accordance with a variation in a power demand associated with the system load outside a threshold level of optimum operation of the at least one power supply in the active mode, the dynamic modification of the mode of operation including executing instructions associated with one of switching between a non-active mode and an active mode and switching between non-active modes,
wherein each of the plurality of power supplies of the power supply set is configured to have modes of operation associated therewith based on the power demand associated with the system load,
wherein the at least one power supply in the active mode is configured to provide requisite power to the system load,
wherein the each of the plurality of power supplies is capable of operating in the active mode and a plurality of non-active modes,
wherein the each of the plurality of power supplies has a priority level associated therewith based on the mode of operation associated therewith, and
wherein whenever the power demand associated with the system load necessitates a power supply in a non-active mode to also be transitioned into the active mode in addition to the at least one power supply already in the active mode, each of the remaining power supplies is transitioned through the processor into a non-active mode having an immediately higher priority level than a current level thereof.

15. The data processing module of claim 14, wherein the processor is further configured to execute instructions associated with:
assigning the priority level to the each of the plurality of power supplies such that the active mode has a higher priority level associated therewith than the plurality of non-active modes, the non-active modes being arranged in a priority order of power consumption of power supplies associated therewith.

16. The data processing module of claim 15, wherein the processor is further configured to execute instructions associated with sequentially modifying a priority level associated with at least one power supply in accordance with one of an increase and a decrease in the power demand associated with the system load.

17. The data processing module of claim 16, wherein the processor is further configured to execute instructions associated with preventing the at least one power supply whose priority level is modified from oscillating through utilizing a hysteresis window set to accommodate a transition between modes of operation of the at least one power supply.

18. The data processing module of claim 15,
wherein the plurality of non-active modes includes a watch mode, a sleep mode and an inactive mode, the watch mode having a higher priority level than the sleep mode and the sleep mode having a higher priority level than the inactive mode, and
wherein a power consumed during the active mode is a maximum, followed by the watch mode, the sleep mode and the inactive mode in decreasing order, the sleep mode being a mode of operation associated with a minimal power utilization of a power supply and the inactive mode being a mode of operation associated with the power supply being turned OFF.

19. The data processing module of claim 14, wherein an upper threshold limit of variation of the system load is associated with a combined power capacity of substantially all power supplies of the power supply set.

20. The data processing module of claim 14, wherein when the power demand associated with the system load is outside the threshold level of optimum operation of the at least one power supply in the active mode, the processor is further configured to execute instructions associated with additionally switching at least one other power supply to the active mode such that an operating level of the at least one power supply in the active mode continues to be within a threshold tolerance range of a rating thereof.

\* \* \* \* \*